United States Patent [19]

Gearheart et al.

[11] 4,200,876
[45] Apr. 29, 1980

[54] WATER LEVEL RECORDER

[75] Inventors: John D. Gearheart, Orangevale; Frederic W. Jenkinson, Carmichael, both of Calif.

[73] Assignee: Systron-Donner Corporation, Concord, Calif.

[21] Appl. No.: 877,240

[22] Filed: Feb. 13, 1978

[51] Int. Cl.² ............................................. G01D 9/30
[52] U.S. Cl. ...................................... 346/49; 346/66; 346/72; 346/139 D
[58] Field of Search ..................... 346/66, 72, 101, 49, 346/139 D, 114; 73/312

[56] References Cited

U.S. PATENT DOCUMENTS

| | | | |
|---|---|---|---|
| 2,516,217 | 7/1950 | Keinath | 346/101 X |
| 2,522,240 | 9/1950 | Sias | 346/139 D X |
| 2,587,079 | 2/1952 | Woods | 346/66 |
| 2,622,001 | 12/1952 | Cooley | 346/139 D |
| 3,309,710 | 3/1967 | Smoot | 346/72 X |
| 3,512,166 | 5/1970 | Gray | 346/66 X |

*Primary Examiner*—Joseph W. Hartary
*Attorney, Agent, or Firm*—Flehr, Hohbach, Test, Albritton & Herbert

[57] ABSTRACT

A water level recorder for use with pressure-sensitive chart paper and having a framework with a lead screw rotatably mounted in the framework. A pulley is secured to the lead screw. The pulley is driven by a tape which is positioned by a float that is adapted to rest upon the surface of the water. A lead screw nut is mounted on the lead screw for movement longitudinally of the lead screw as the lead screw is rotated. A marking member for marking the chart paper is carried by the lead screw nut. A drum is secured to the lead screw for rotation with the lead screw. A helix for marking the chart paper is formed on the drum. Chart paper drive means is provided for advancing the chart paper over the helix and the marking member. Platen assemblies movable into and out of engagement with the chart paper are adapted to engage the chart paper to retain it in engagement with the marking member and the helix so that two traces are formed on the chart paper as the chart paper is advanced, one by the marking member and one by the helix to give coarse and vernier indications respectively of the water level being measured.

8 Claims, 7 Drawing Figures

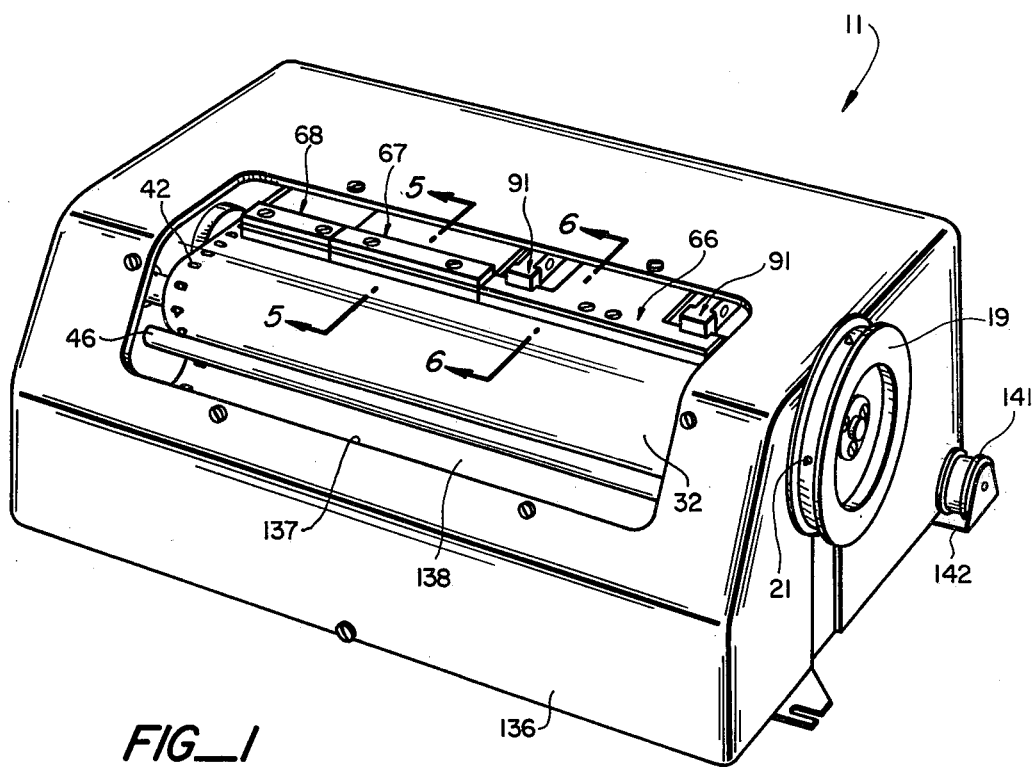
FIG_1
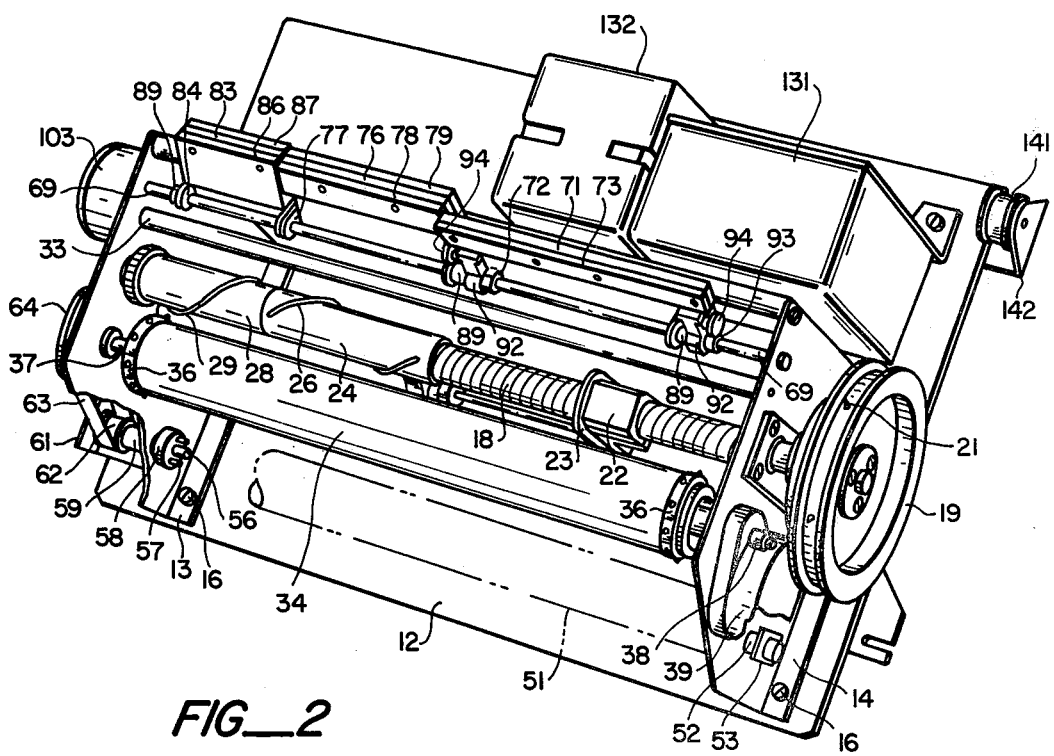
FIG_2

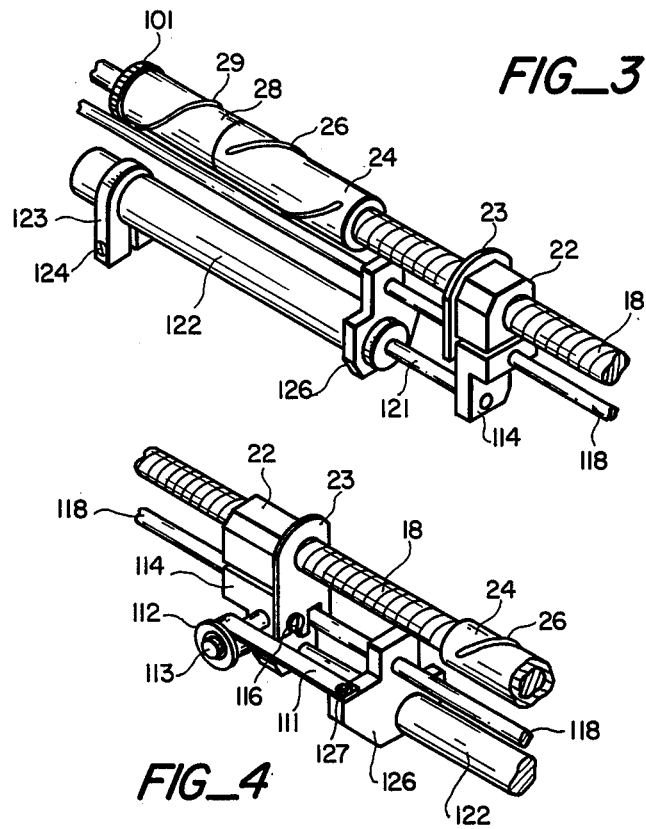
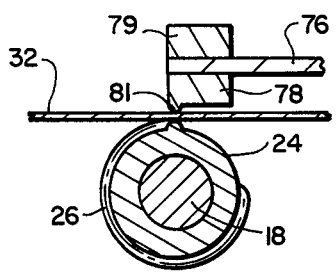
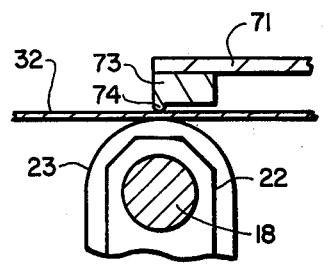
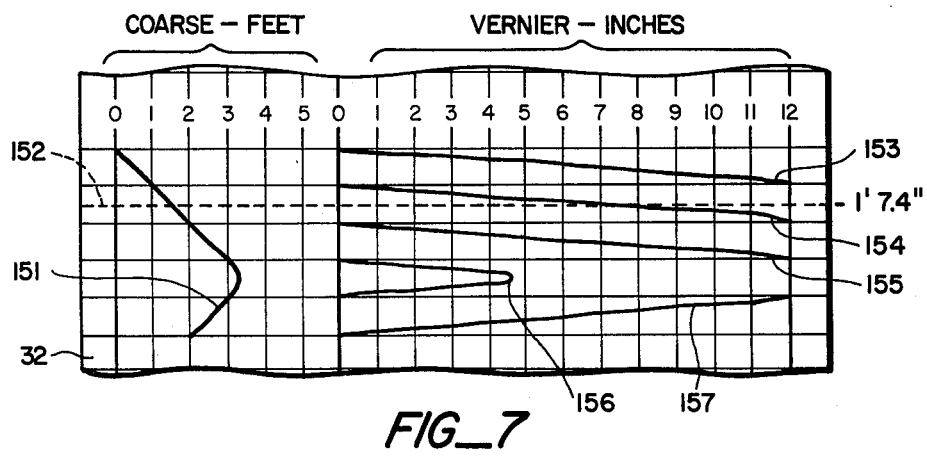

WATER LEVEL RECORDER

BACKGROUND OF THE INVENTION

Water level recorders have been provided in that past and have principally utilized chains which drive a series of gears which are utilized for driving one or more pens on a strip chart. In such water level recorders it has been found that there are many instances of lost motion which cause inaccuracy between the two pens. Another difficulty with such recorders has been that the positions recorded on the strip charts by the pens do not represent the same times and the same locations. In other words, one pen at a particular point in time would be recording at a different point in time than the other pen. Because of such time separations, it has been difficult to read the charts which have been produced by such water level recorders. In addition, there has been tendency for reading errors in reading the charts to occur. In addition, it has been difficult in certain situations where the water level is rising and falling to determine whether or not a pen reversal has taken place because the water level had changed or because the edge of the chart had been reached. There is, therefore, need for an improved water level recorder.

SUMMARY OF THE INVENTION AND OBJECTS

In general, it is an object of the present invention to provide a water level recorder in which it is possible to make in-line coarse and vernier line displays or traces on the chart paper.

Another object of the invention is to provide a water level recorder of the above character in which reversals in water level are easy to ascertain.

Another object of the invention is to provide a water level recorder of the above character which has great accuracy.

Another object of the invention is to provide a water level recorder of the above character which can be readily changed in reading in feet to meters and vice versa.

Another object of the invention is to provide a water level recorder of the above character in which helices are utilized to provide very fine lines on the chart paper.

Another object of the invention is to provide a water level recorder of the above character in which the opportunities for making errors in reading the chart paper are greatly minimized.

Additional objects and features of the invention will appear from the following description in which the preferred embodiment is set forth in detail in conjunction with the accompanying drawings.

BRIEF DESCRIPTION OF THE DRAWINGS

FIG. 1 is a perspective view of a water level recorder incorporating the present invention.

FIG. 2 is a view of the water level recorder as shown in FIG. 2 with the top cover removed.

FIG. 3 is an enlarged isometric view of the driving mechanism utilized in the water level recorder of the present invention showing the lead screw and the drum carrying the helix.

FIG. 4 is an enlarged view of another portion of the water level recorder of the present invention particularly showing the means for minimizing backlash.

FIG. 5 is a cross sectional view showing the manner in which the chart paper is engaged by the helix carried by the drum.

FIG. 6 is a cross sectional view showing the manner in which the chart paper is engaged by the marking member carried by the lead screw nut.

FIG. 7 is a strip chart made on the water level recorder of the present invention.

DESCRIPTION OF THE PREFERRED EMBODIMENT

The water level recorder 11 of the present invention consists of a base plate 12 which has a pair of spaced parallel end plates 13 and 14 mounted upon the base plate by screws 16 and upstanding therefrom. A lead screw 18 is rotatably mounted in brackets 13 and 14. A tape pulley 19 is secured to one end of the lead screw 18 by suitable means such as set screws (not shown). The tape pulley 19 is provided with a plurality of teeth 21 which are adapted to engage perforations provided in the tape which is utilized with the water level recorder. A lead screw nut 22 is threadably mounted on the lead screw and is advanced longitudinally of the lead screw as the lead screw is rotated as hereinafter described. The nut 22 carries a plate 23 which provides a raised ridge and serves as a marking member for the purpose hereinafter described.

A helix drum 24 is mounted upon the lead screw 18 and is retained thereon by set screws (not shown). The helix drum 24 carries a one spiral helix 26 so that for every revolution of the pulley 19, the lead screw and the helix 26 carried thereby passes through one turn.

Another optional helix drum 28 can be provided as shown. It is rotatably mounted on one end of the lead screw by suitable means such as set screws (not shown). It is also provided with a spiral helix 29.

A paper supply roll (not shown) is disposed between the end plates 13 and 14 to the rear of the base plate 12 and mounted therebetween in a conventional manner so that it can be rotated to dispense chart paper 32. The chart paper 32 is dispensed upwardly through a chute (not shown) and is then passed over a roller 33, over the helix drums 24 and 26, and then over a drive tube 32 which has a pair of drive sprockets 36 mounted at the opposite ends thereof. The sprockets 36 are mounted upon shafts 37 and 38 which are rotatably mounted in the end plates 13 and 14. Shaft 38 is driven at a desired speed by a stepping motor 39 which is mounted on the bracket 14. The sprockets 36 are adapted to engage perforations 42 which are provided at opposite margins of the chart paper so that the chart paper is positively driven as the gear motor 39 is operated.

The chart paper, after it passes over the drive tube 34, moves downwardly and behind a roller 46 and then passes over a fixed frame spacer (not shown). The frame spacer is mounted between end plates 13 and 14.

A rewind core 51 for the chart paper is removably mounted between the end plates 13 and 14 which serve as frame members. Rewind core 51 has one end rotatably mounted on a pivot pin 52 which is slidably mounted in plate 14 and is carried by a bracket 53 secured to the end plate 14 so that the pivot pin can be inserted into the rewind core to retain the rewind core and retracted to permit removal of the rewind core. The other end of the rewind core is adapted to be engaged by another pivot pin 56 and a pair of drive pins 57. Drive pins 57 are carried by a hub 58 mounted upon a shaft 59 which is rotatably mounted in the end plate 13 and a support bracket 61. Shaft 59 is provided with a pulley 62 mounted thereon. Pulley 62 is driven by a belt 63 which is driven by pulley 64 mounted on and driven by the shaft 37.

First and second platen assemblies 66, 67 and 68 are provided and are mounted for pivotal movement upon a shaft 69 extending between the end plates 13 and 14. The platen assembly 66 can be identified as a coarse range platen whereas the platen assembly 67 can be identified as a vernier range platen. The platen assembly 68 can be identified as the precipitation recorder platen. The platen assembly 66 consists of a platen 71 in the form of a flat plate which is provided with spaced depending ears 72 which are mounted upon the shaft 69. A bar 73 is secured to the platen 71 by suitable means such as screws (not shown) and is provided with a depending writing lip or ridge 74. The platen assembly 67 is constructed in a similar manner and consists of a platen 76 in the form of a flat plate which is provided with depending ears 77 also pivotally mounted upon the shaft 69. A pair of bars 78 and 79 are secured to the forward extremity of the platen 76 by suitable means such as screws (not shown). The bar 78 is provided with a writing lip or ridge 81. The bar 79 serves as a weight. The platen assembly 68 consists of a platen 83 which also has depending ears 84 pivotally mounted upon the shaft 69. Bars 86 and 87 are secured to the forward extremity of the platen by suitable means such as screws (not shown). The bar 86 is provided with a writing lip 88 whereas the bar 87 serves as a weight.

The longitudinal positioning of the platen assemblies 66, 67 and 68 on the shaft 69 is controlled by use of a plurality of collars 89 which are secured to the shaft 69 by suitable means such as set screws in predetermined positions to maintain the platen assemblies in the desired positions on the shaft. Expansion trace assemblies 91 are provided as a part of the platen assemblies 66, 67 and 68. Each of the expansion trace assemblies 91 consists of an arm 92 which is pivotally mounted on the shaft 69 and is retained in a predetermined position on the shaft 69 by collars 93. An expansion trace wheel 94 is threadedly mounted in the arm 92 and is adapted to be adjusted laterally thereof to the desired position. The expansion trace assemblies 91 can be set in any desired location as, for example, the expansion trace wheels 94 can be adjusted so that they are set a zero and full scale of the range scale provided. As shown, the expansion trace assemblies 91 are mounted on opposite sides of the coarse platen assembly.

The helix drum 28 is rotated in a suitable manner as, for example, by use of a spur gear 101 which is secured to the helix drum 28. The spur gear 101 is driven by another spur gear (not shown) which is driven by a stepping motor 103 mounted upon the end plate 13.

Means is provided in connection with the nut 22 mounted on the lead screw 18 so there is substantially no lost motion between the screw and the nut. This means is in the form of a constant force spring which applies a constant force pulling in one direction to remove any backlash. The constant force spring 111 is wound onto a drum 112. The drum 112 is rotatably mounted upon a pin 113 which is carried by a coupling member 114. The coupling member 114 is secured to the plate 23 mounted upon the lead screw nut 22 by suitable means such as a screw 116. The member 114 is slidably mounted upon a guide shaft 118 mounted between the end plates 13 and 14. A movable shaft 121 of a linear potentiometer 122 is secured to the coupling member 114. The linear potentiometer 122 is supported by a clamp 123 which is secured to the potentiometer 122 by tightening of a screw 124. The clamp 123 is secured to the end plate 13 by suitable means such as screws (not shown). A spring anchor 126 is secured to the forward extremity of the potentiometer 122 and has one end of the spring 111 secured thereto by a spring 127. As shown, the guide rod 118 extends through the spring anchor 126.

A power supply 131 is mounted upon the base plate 12 with its associated battery supply 132. The power supply 131 contains a battery operated crystal controlled electronic clock which provides a series of output pulses which drives the stepping motor 39 which is utilized for driving the strip chart. The power supply 131 is provided with switches (not shown) to permit selectable recording speeds of suitable types as, for example ¼, ½, 1 and 2 inches per hour.

The entire assembly hereinbefore described is enclosed in a case 136 which is mounted over the base plate 12. It is provided with a cutout 137 which has a window 138 mounted therein to permit viewing of the chart paper as it is advanced through the water level recorder.

As can be seen, when the cover 136 is in place, the pulley 19 is exposed on the exterior of the case. Similarly, there is a small guide pulley 141 provided on the exterior of the case 136 and which is carried by a bracket 142 mounted upon the base plate 12 to the rear right hand side of the plate as viewed in FIGS. 1 and 2.

Operation and use of the water level recorder may now be briefly described as follows. Let it be assumed that a conventional perforated stainless steel tape has been provided which has a float on one end and a counter weight on the other end. Both the float and the counter weight are placed in the standpipe in which the water level is to be measured with the float resting on the surface of the water. Thereafter the tape is reeved over the pulley 19 and, if desired, over the guide pulley 141. The tape is reeved in such a manner that the perforations in the tape are lodged on the projections or teeth 21 provided on the pulley 19.

Let it be assumed that chart paper 32 has been installed in the recorder and has been positioned in the manner hereinbefore described and as shown particularly in FIG. 1. The desired chart speed is then selected on the power supply 131. The platen assemblies 66, 67 and 68 are then lowered upon the chart paper.

As the water level raises or lowers, the pulley 19 rotates the lead screw 18 and the helix drum 24 secured thereto. The chart paper 32 which is utilized is a pressured sensitive paper. As the lead screw 18 is rotated, five marks may be made on the chart paper, one by the ridge 23, one by the helix 26, and another by the helix 29 if it is used. In addition, two additional marks will be placed on the chart paper by the two expansion trace wheels 94. The helices 26 and 29 as well as the ridge 23 provide marks on the paper because of the pressure exerted on the paper by the platen assemblies 66, 67 and 68. The upper curved surface of the guide 23 as well as the helices 26 and 29 serve to provide single points under the platens 66, 67 and 68 at each moment in time so that as the lead screw 18 is rotated, traces in the form of single lines are provided. By such an arrangemnt, it can be seen that the data for the coarse reading and for the vernier reading are made at the same point in time and, in fact, are in exact alignment upon the strip chart.

The trace 151, which is the coarse reading, is provided by the marking member 23. As shown in FIG. 7, the water level recorded is rising at approximately one foot per hour to a certain period of time and thereafter is decreasing at approximately the same rate. Let it be assumed that it be desired to make a reading at a certain point in time as represented by the dotted line 152 shown in FIG. 7 which represents a particular point in time on the strip chart 32. The dotted line intersects the coarse trace 151 at a point which is slightly above the one foot mark. To then determine the level of water above the one foot mark, one need merely glance over to the vernier side of the chart in which it can be seen that one revolution of the helix 26 occurs for every 12 inches in variation in height which represents one complete revolution of the helix 24. These traces are represented by traces 153, 154, 155, 156 and 157 as shown in FIG. 7. The dotted line 152 intersects the trace 154 at a point which represents approximately 7.4 inches on the vernier scale so that at that particular time represented by the dotted line 152, the water level is at 1', 7.4". Similar accurate readings can be obtained at differing points in time by merely drawing a line such as represented by the dotted line 152 through the coarse and vernier traces. It can be seen from FIG. 7 at between 4 and 5 feet, the level of the water stopped rising and started decreasing, This change is more accurately represented by the vernier trace 156. Thus it can be seen there is absolutely no ambiguity in the scales and it is immediately apparent when a reversal in the direction of the water level occurs.

The trace provided by the helix 29 engaged by the platen assembly 68 is not shown in FIG. 7. However, this drum 28 carrying the helix 29 can be driven by a separate stepping motor such as the stepping motor 103 which can be conducted to a standard rain gauge and for every tip of the bucket which represents 1/10 of an inch of range, the helix is driven to indicate 1/10 of an inch on the helix. It is obvious that measurements other than precipitation can also be measured merely by driving the helix drum 28.

Also the traces provided by the expansion trace wheels 91 are not shown in FIG. 7. These expansion trace wheels are normally set at the beginning of the recording operation at a precise distance apart as, for example, 5 inches. If the paper should happen to expand or contract, this expansion or contraction can be readily ascertained by determining the spacing between the trace wheel lines and then calculating a factor which should be utilized to apply to the water level readings obtained from the traces from the coarse and fine verniers.

Thus, in summary, it can be seen there is provided a water level recorder which utilizes a counterbalanced float which rotates a pulley either clockwise or counterclockwise as the water level rises or falls. Two pens are attached to the pulley shaft in the form of the ridge 23 and the helix 26 to indicate the coarse pen range and the fine detail or vernier of the range. English units of measurement or metric units of measurement can be obtained merely by changing the pulleys. By way of example, when measuring English units, the pulley 19 would have a one-foot circumference whereas when metric measurements are to be made, the pulley would have a one-meter circumference.

It can be seen that the traces are made by pens mounted on the same shaft and that both traces appear side by side as shown in FIG. 7. Since there is substantially no backlash provided in the system because of the use of the constant spring 111, very accurate readings can be obtained with the use of the vernier scale.

The linear potentiometer 122 provides an electrical output giving an indication of the position of the nut 22 on the lead screw and can be utilized to provide information for telemetry applications. The constant force spring 111 maintains a constant torque on the coarse range pen potentiometer shaft 121 throughout the entire travel of the potentiometer wiper (not shown) of the potentiometer 122.

It can be seen from the foregoing that there has been provided a water level recorder which is of a precision type which produces very fine lines so that precision readings can be made and in which the vernier and coarse traces are in line so that there are no ambiguities and also to thereby minimize errors in readings of the traces.

What is claimed is:

1. In a water level recorder for use with chart paper, a framework, a single lead screw rotatably mounted in the framework, a pulley secured to the lead screw, a tape engaging the pulley and being positioned by a float adapted to rest upon the water, a lead screw nut mounted on the lead screw for movement longitudinally of the lead screw as the lead screw is rotated, a marking member carried by the lead screw nut, a drum secured to the lead screw for rotation with the lead screw, a helix formed on the drum, an additional drum in axial alignment with the first named drum and rotatably mounted with respect to the first named drum, a helix formed on the additional drum, means for advancing the additional drum independent of the float for giving an indication of another parameter being measured, means adapted to engage the chart paper and for advancing the chart over the helix of the first named drum, the helix of the additional drum and the marking member, means adapted to engage the chart paper to retain it in direct engagement with the marking member and the helix of the first named drum so that two traces are formed on the chart paper as the chart paper is advanced one by the marking member and one by the helix of the first named drum to give course and vernier indications respectively of the water level being measured and means adapted to engage the chart paper to retain it in engagement with the helix on the additional drum so that an additional trace is formed on the chart paper of the additional parameter.

2. A water level recorder as in claim 1 wherein said means adapted to engage the chart paper and to retain it in engagement with the marking member and the helix comprises first, second and third generally planar platen assemblies and means for mounting the first, second and third platen assemblies so that they can be moved into and out of engagement with the chart paper.

3. A water level recorder as in claim 2 wherein the platen assemblies adapted to engage the chart paper and retain it in engagement with the respective helix includes means forming a depending lip extending downwardly from the platen assembly and extending longitudinally of the drum and adapted to come into engagement with the helix on the drum.

4. A water level recorder as in claim 3 wherein said platen assembly includes a bar extending longitudinally of the platen assembly and wherein said depending lip is formed integral with the bar.

5. A water level recorder as in claim 2 wherein said chart paper is of a pressure-sensitive type and wherein said means adapted to engage the chart paper to retain it in engagement with the marking member and the helix of the first named drum and the helix of the additional drum includes means for applying a force to the first, second and third platen assemblies so that the chart paper is positively urged into engagement with the marking member and the helix.

6. A water level recorder as in claim 1 together with spring means for applying a constant force between the lead screw and the lead screw nut so that backlash is minimized.

7. A water level recorder as in claim 1 together with a linear potentiometer mounted on said base and secured to said lead screw nut to make it possible to provide an electrical indication of the position of the lead screw nut.

8. A water level recorder as in claim 1 wherein said helix on said first named drum extends through only one revolution.

* * * * *